(12) United States Patent
Kato et al.

(10) Patent No.: US 9,240,709 B2
(45) Date of Patent: Jan. 19, 2016

(54) MANUFACTURING METHOD FOR ELECTRIC MOTOR ROTOR

(75) Inventors: Susumu Kato, Anjo (JP); Shigeru Maeda, Toyota (JP); Takeshi Yokoyama, Anjo (JP); Takuya Ooura, Oobu (JP); Motoki Koori, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 39 days.

(21) Appl. No.: 13/981,102

(22) PCT Filed: Feb. 3, 2012

(86) PCT No.: PCT/JP2012/052458
§ 371 (c)(1),
(2), (4) Date: Jul. 23, 2013

(87) PCT Pub. No.: WO2012/108341
PCT Pub. Date: Aug. 16, 2012

(65) Prior Publication Data
US 2013/0298384 A1    Nov. 14, 2013

(30) Foreign Application Priority Data
Feb. 8, 2011    (JP) .................................. 2011-024550

(51) Int. Cl.
H02K 15/02    (2006.01)
H02K 15/10    (2006.01)
H02K 15/03    (2006.01)
H02K 1/27    (2006.01)

(52) U.S. Cl.
CPC .............. *H02K 15/03* (2013.01); *H02K 1/2766* (2013.01); *Y10T 29/49012* (2015.01)

(58) Field of Classification Search
CPC ....... H02K 15/03; H02K 1/278; H02K 1/223; H02K 1/276; Y10T 29/49012; Y10T 29/49009; Y10T 29/49073
USPC ........ 29/598, 596, 604, 607, 609; 310/26, 43, 310/114, 156.05, 156.23, 156.53, 216.004
See application file for complete search history.

(56) References Cited

U.S. PATENT DOCUMENTS

| 6,822,359 B2 * | 11/2004 | Joho ......................... 310/156.23 |
| 7,653,984 B2 | 2/2010 | Amano et al. |
| 7,950,133 B2 | 5/2011 | Amano et al. |

(Continued)

FOREIGN PATENT DOCUMENTS

| CN | 101282060 A | 10/2008 |
| CN | 101356711 A | 1/2009 |

(Continued)

OTHER PUBLICATIONS

International Search Report issued in International Patent Application No. PCT/JP2012/052458 dated Apr. 24, 2012.

*Primary Examiner* — Thiem Phan
(74) *Attorney, Agent, or Firm* — Oliff PLC (57) ABSTRACT

A manufacturing method for an electric motor rotor includes: a stacking process in which a plurality of iron core pieces are stacked to form a laminated iron core; a magnet insertion process in which a permanent magnet is inserted into a magnet insertion hole provided in the laminated iron core; a resin filling process in which the laminated iron core is heated to fill the magnet insertion hole with a molten resin for magnet fixation; and a rotary shaft assembly process in which a rotary shaft is warm-fitted into a rotary shaft insertion hole of the laminated iron core utilizing residual heat from the heating of the laminated iron core 10 in the resin filling process.

2 Claims, 9 Drawing Sheets

(56) References Cited

U.S. PATENT DOCUMENTS

| | | |
|---|---|---|
| 8,127,431 B2 | 3/2012 | Amano et al. |
| 8,922,084 B2 * | 12/2014 | Nagai et al. ............. 310/156.53 |

FOREIGN PATENT DOCUMENTS

| | | | | |
|---|---|---|---|---|
| JP | A-3-82349 | 4/1991 | | |
| JP | A-2001-87949 | 4/2001 | | |
| JP | A-2001-178086 | 6/2001 | | |
| JP | A-2003-189560 | 7/2003 | | |
| JP | A-2007-152517 | 6/2007 | | |
| JP | 2007-282358 A | 10/2007 | | |
| JP | 2008-042967 A | 2/2008 | | |
| JP | 2008-199890 A | 8/2008 | | |
| JP | A-2010-119260 | 5/2010 | | |
| JP | A-2010-158164 | 7/2010 | | |
| JP | 2012-161209 | * | 8/2012 | ............ H02K 15/12 |
| JP | 2012-161209 A | | 8/2012 | |

* cited by examiner

MANUFACTURING METHOD FOR ELECTRIC MOTOR ROTOR

INCORPORATION BY REFERENCE

The disclosure of Japanese Patent Application No. 2011-024550 filed on Feb. 8, 2011 including the specification, drawings and abstract is incorporated herein by reference in its entirety.

BACKGROUND OF THE INVENTION

The present invention relates to a manufacturing method for an electric motor rotor including a laminated iron core and a rotary shaft.

DESCRIPTION OF THE RELATED ART

As a method of fixing a rotary shaft to a laminated iron core in an electric motor rotor for use in an electric motor, warm fitting in which the laminated iron core is heated to increase the inside diameter of a rotary shaft insertion hole, the rotary shaft is inserted into the rotary shaft insertion hole, and the laminated iron core is cooled to reduce the inside diameter of the rotary shaft insertion hole is often used. Known examples of a method of heating the laminated iron core during warm fitting include a method which uses heating through electromagnetic induction by a heating coil described in Japanese Patent Application Publication No. 3-82349 (JP 3-82349 A) and Japanese Patent Application Publication No. 2007-152517 (JP 2007-152517 A), and a method in which the laminated iron core is immersed in heated oil described in Japanese Patent Application Publication No. 2001-87949 (JP 2001-87949 A).

SUMMARY OF THE INVENTION

Any of the methods described in JP 3-82349 A, JP 2007-152517 A, and JP 2001-87949 A requires a heating device dedicated to warm fitting, and it is necessary to add a heating device dedicated to warm fitting to a production line for manufacture of electric motor rotors. In a manufacturing method for an electric motor rotor, meanwhile, the laminated iron core may be heated in processes other than warm fitting. For example, the method may include a resin filling process in which a permanent magnet is fixed to the laminated iron core, and the warm fitting process discussed above. In this case, a heating process is provided for each of the resin filling process and the warm fitting process. In recent circumstances where there is an increasing tendency toward energy saving and cost reduction, it is necessary to develop a technology for improving the production efficiency and promoting energy saving by reducing the time for heating and cooling and the amount of consumption of energy such as electric power for a plurality of times of heating and cooling.

The present invention has been made in view of such issues, and therefore it is an object thereof to provide a manufacturing method for an electric motor rotor that can improve the production efficiency and contribute to energy saving.

An aspect of the present invention provides a manufacturing method for an electric motor rotor, including:

a stacking process of stacking a plurality of iron core pieces formed in a desired shape to form a laminated iron core;

a magnet insertion process of inserting a magnet into a magnet insertion hole provided in the laminated iron core;

a resin filling process of heating the laminated iron core to fill the magnet insertion hole with a molten resin for magnet fixation; and a rotary shaft assembly process of warm-fitting a rotary shaft into a rotary shaft insertion hole of the laminated iron core utilizing residual heat from the heating of the laminated iron core in the resin filling process.

The manufacturing method for an electric motor rotor includes a rotary shaft assembly process in which a rotary shaft is warm-fitted into a rotary shaft insertion hole of the laminated iron core utilizing residual heat from the heating of the laminated iron core in the resin filling process. Therefore, it is not necessary to dispose a device that heats the laminated iron core for warm fitting in the production line for carrying out the manufacturing method for an electric motor rotor. Then, while it has originally been necessary to provide a dedicated heating process to each of two processes, namely the resin filling process and the rotary shaft assembly process, it is only necessary to provide a heating process as one process in the resin filling process. Consequently, it is possible not only to reduce the equipment cost for the heating devices, but also to reduce the time for heating and cooling and the consumption of energy such as electric power during production of electric motor rotors. This further improves the production efficiency for electric motor rotors, and promotes energy saving.

Thus, the manufacturing method for an electric motor rotor can improve the production efficiency, and contribute to energy saving.

DETAILED DESCRIPTION OF THE EMBODIMENTS

In the manufacturing method for an electric motor rotor, the resin filling process may be performed with the laminated iron core heated to a temperature range of 150° C. to 200° C., and the rotary shaft assembly process may be performed while the laminated iron core is in a temperature range of 140° C. to 180° C. because of residual heat from the resin filling process. In this case, resin filling operation in the resin filling process and warm fitting operation in the rotary shaft assembly process can be performed reliably.

In the case where the heating temperature in the resin filling process is equal to or less than 150° C., the molten resin may not flow well or may not be shaped well in the resin filling operation. If the laminated iron core is heated to a temperature region of more than 200° C., meanwhile, the allowable temperature of the resin may be exceeded.

In the case where the temperature of the laminated iron core in the rotary shaft assembly process is equal to or less than 140° C., the inside diameter of the rotary shaft insertion hole may not be increased sufficiently, which may hinder assembly. If the laminated iron core is in a temperature region of more than 180° C., meanwhile, residual heat from the resin filling process may not be sufficient, and it may be necessary to heat the laminated iron core again.

EMBODIMENT

First Embodiment

A manufacturing method for an electric motor rotor according to an embodiment will be described with reference to FIGS. 1 to 7.

Figure 1:
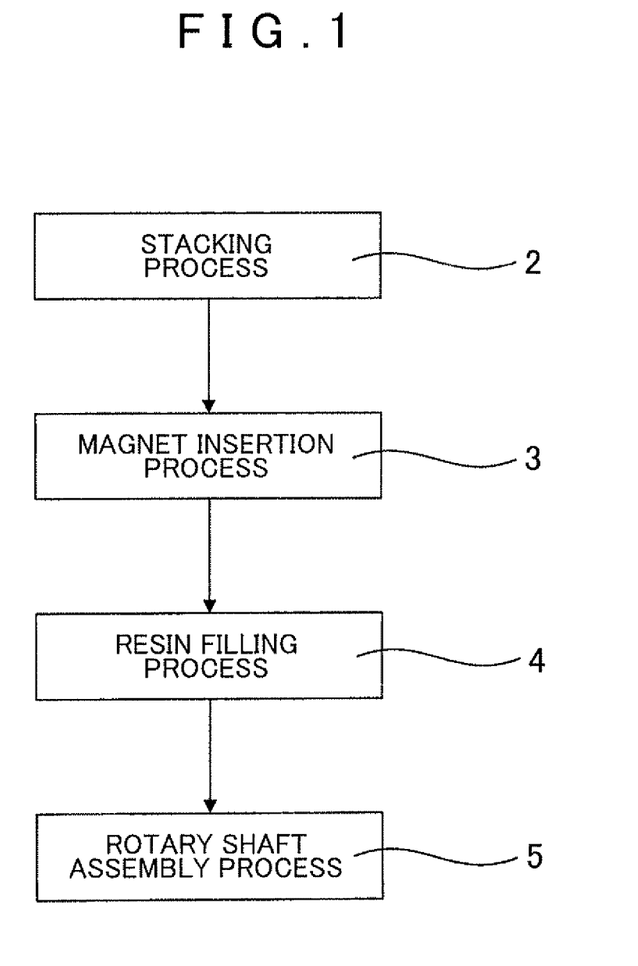
FIG. 1 illustrates a production line for carrying out a manufacturing method for an electric motor rotor according to a first embodiment.

As shown in FIG. 1, the manufacturing method for an electric motor rotor according to the embodiment includes: a stacking process 2 in which a plurality of iron core pieces 11 formed in a desired shape are stacked to form a laminated iron core 10; a magnet insertion process 3 in which a permanent magnet 16 is inserted into a magnet insertion hole 13 provided in the laminated iron core 10; a resin filling process 4 in which the laminated iron core 10 is heated to fill the magnet insertion hole 13 with a molten resin 14 for magnet fixation; and a rotary shaft assembly process 5 in which a rotary shaft 15 is warm-fitted into a rotary shaft insertion hole 12 of the laminated iron core 10 utilizing residual heat from the heating of the laminated iron core 10 in the resin filling process 4.

The embodiment will be described in detail below.

A production line for carrying out the manufacturing method for an electric motor rotor according to the present embodiment includes a device for execution of the stacking process 2, a device for execution of the magnet insertion process 3, a device for execution of the resin filling process 4, and a device for execution of the rotary shaft assembly process 5, which are disposed in a sequence. In the production line, a transfer rail (not shown) is disposed to extend at least from the terminal end portion of the device for execution of the stacking process 2 to the starting end portion of the device for execution of the rotary shaft assembly process 5 so that a gate plate 6 to be discussed later is movable on the transfer rail.

Figure 2:
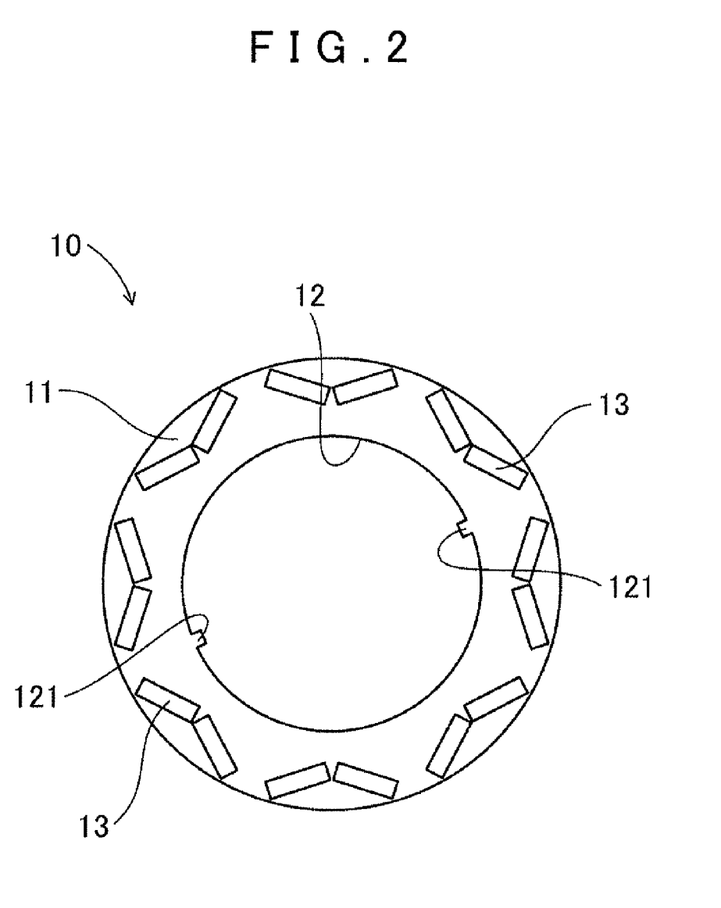
FIG. 2 is a plan view showing a laminated iron core according to the first embodiment.

In the stacking process 2, a plurality of iron core pieces 11 shaped as shown in FIG. 2 are successively punched out of a belt-like steel sheet, and are stacked on and crimped to each other to form a laminated iron core 10. The stacking process 2 is performed using a pressing device (not shown). As shown in FIG. 2, the laminated iron core 10 includes one rotary shaft insertion hole 12 for insertion of a rotary shaft 15 (FIG. 7) and sixteen magnet insertion holes 13 for insertion of permanent magnets 16 (FIG. 7), the holes being formed to penetrate the laminated iron core 10 in the axial direction. Projected portions 121 are formed on the inner peripheral surface of the rotary shaft insertion hole 12 at positions opposite to each other. The projected portions 121 are provided to be fitted with key grooves (not shown) of the rotary shaft 15, and also used for positioning with respect to the gate plate 6 to be discussed later.

The device for execution of the magnet insertion process 3 includes a magnet insertion robot (not shown) that automatically operates to insert the permanent magnets 16 into the magnet insertion holes 13 of the laminated iron core 10.

The device for execution of the resin filling process 4 includes a heating device (not shown) that preliminarily heats the laminated iron core 10, and a resin filling device 40 (FIG. 6) that fills the magnet insertion holes 13 with the molten resin 14 for magnet fixation and thermally cures the molten resin 14. The molten resin 14 according to the present embodiment is obtained by heating a thermosetting resin to cause a state change into a liquid form. The thermosetting resin in a liquid form is cured by being heated, and is not changed into a liquid form even if the thermosetting resin is heated after being cured.

The heating device used in the present embodiment has a tunnel shape, and includes an electric heater provided inside. The transfer rail is also disposed inside the heating device so that the gate plate 6 to be discussed later on which the laminated iron core 10 is placed is movable on the transfer rail.

Figure 6:
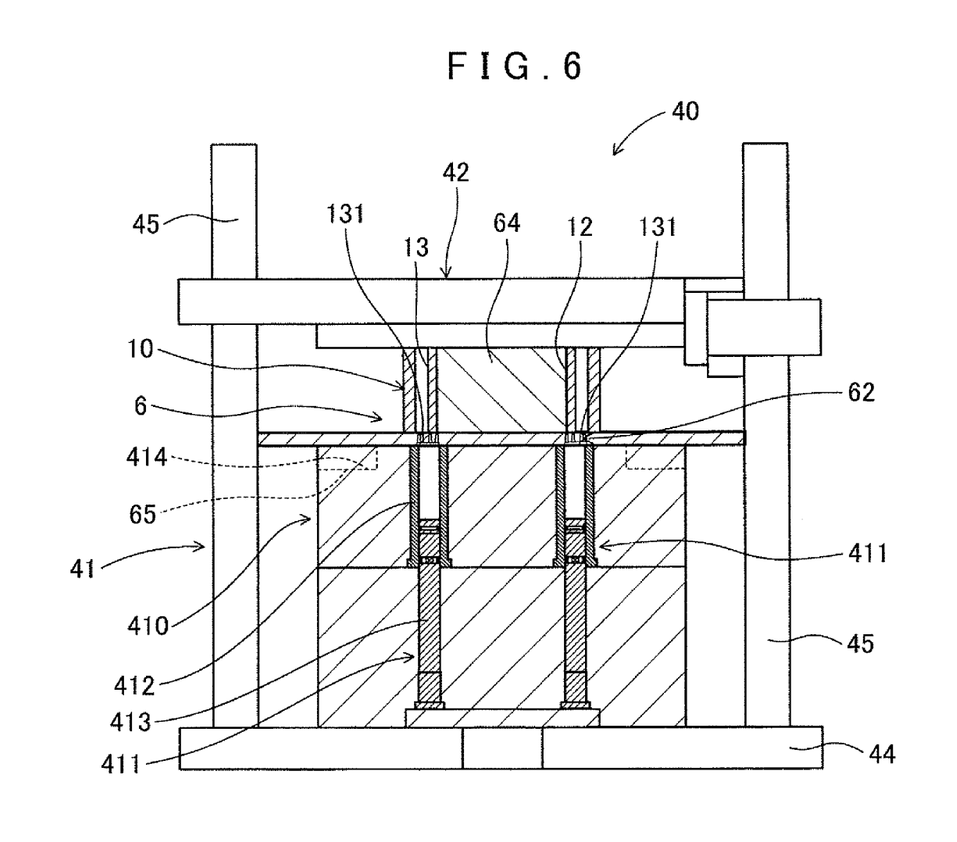
FIG. 6 illustrates a resin filling device coupled to the gate plate according to the first embodiment.

As shown in FIG. 6, the resin filling device 40 includes a resin feeding mold 41 disposed below the laminated iron core 10 to feed the molten resin 14 into the magnet insertion holes 13, and a facing mold 42 disposed above the laminated iron core 10 so as to be movable in the up-down direction.

As shown in FIG. 6, the resin feeding mold 41 is formed by integrating the gate plate 6, which also serves as a pallet on which the laminated iron core 10 is placed as discussed above, with a mold body portion 410. The gate plate 6 is coupled to the mold body portion 410 with its lower surface being in abutment with the upper surface of the mold body portion 410. As shown in FIG. 6, a feeding mechanism portion 411 that feeds the molten resin 14 toward a discharge port 62 of the gate plate 6 is provided in the mold body portion 410 at a position corresponding to the discharge port 62. The feeding mechanism portion 411 includes a cylindrical inner tubular portion 412 disposed to extend in the up-down direction, and a plunger 413 configured to be movable back and forth in the inner tubular portion 412 along its axial direction. The inner tubular portion 412 is supplied with the molten resin by a molten resin supply device (not shown). The plunger 413 is raised to feed the molten resin from the inner tubular portion 412 toward the discharge port 62.

As shown in FIG. 6, the facing mold 42 is disposed above the laminated iron core 10 so as to be movable up and down via guide poles 45 provided to extend upright from a base portion 44 that supports the resin feeding mold. The facing mold 42 is movable up and down along the guide poles 45 and capable of applying a compression force, with the laminated iron core 10 held between the resin feeding mold 41 and the facing mold 42, through a pressing mechanism portion (not shown).

Figure 3:
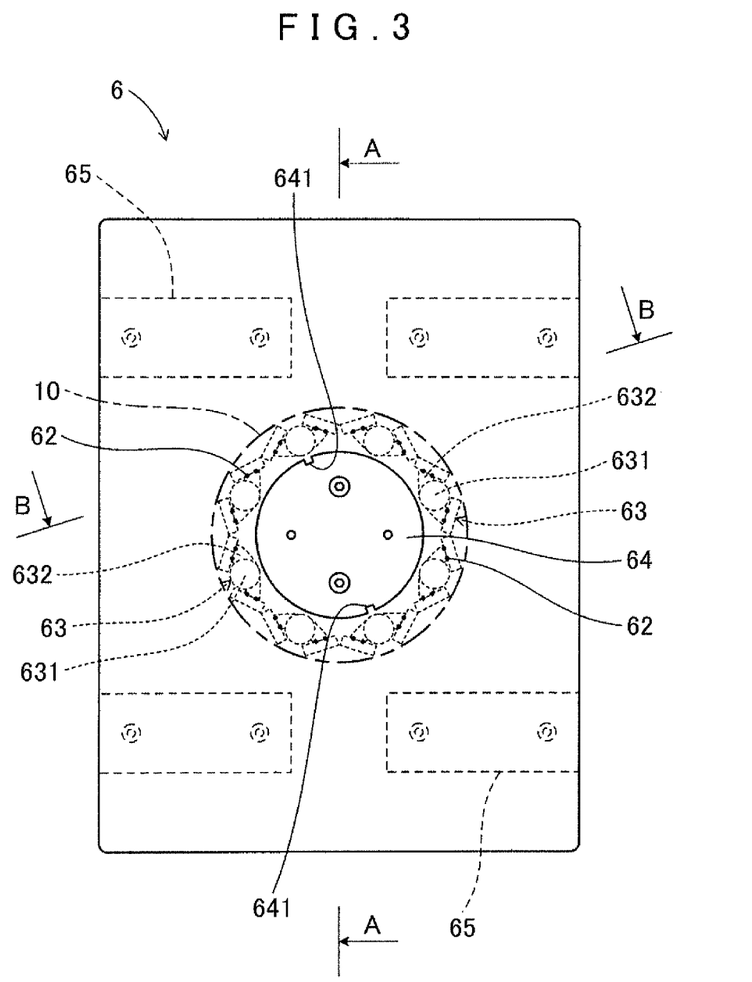
FIG. 3 is a plan view of a gate plate according to the first embodiment.
Figure 4:
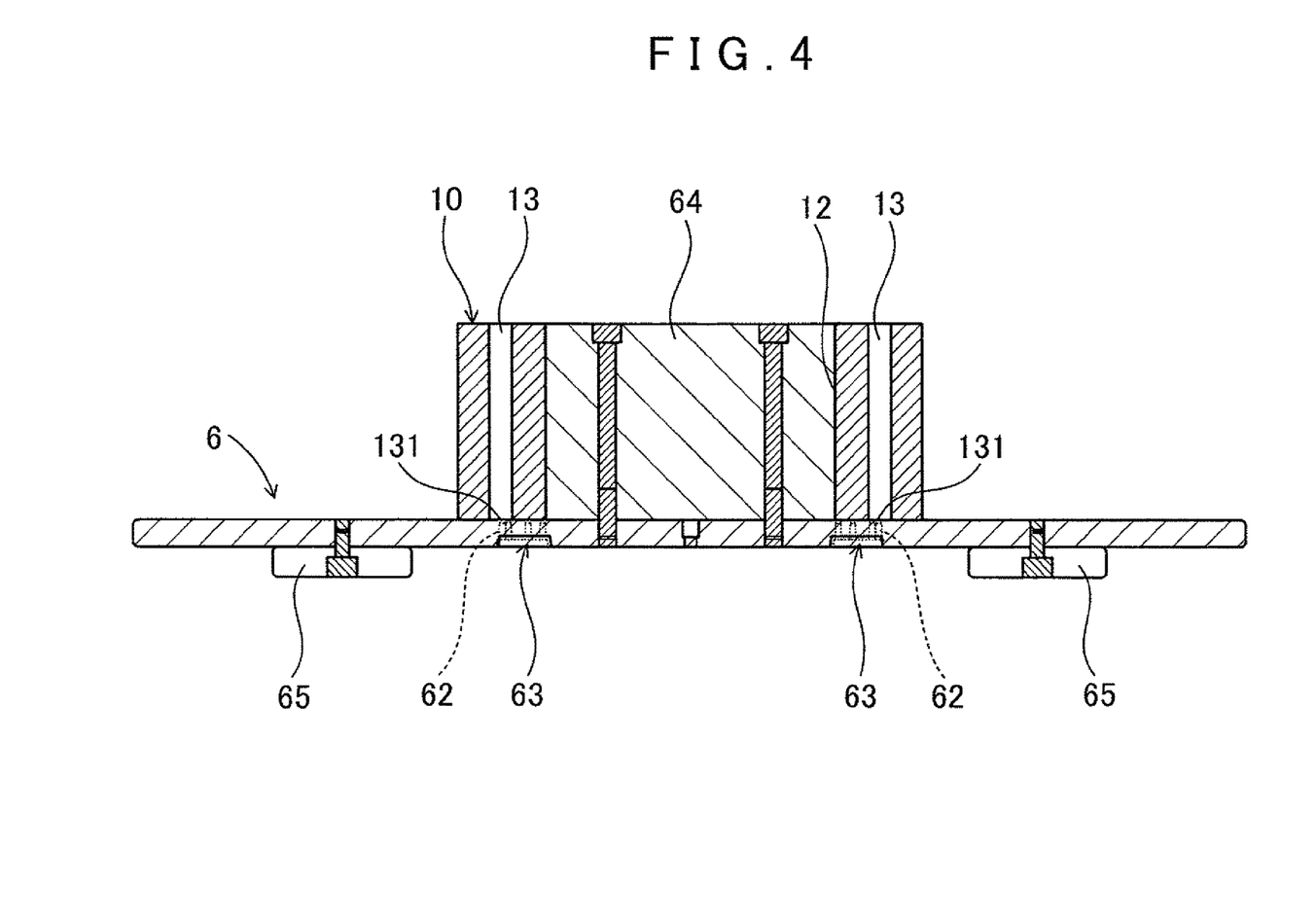
FIG. 4 is a sectional view taken along the line A-A of FIG. 3 with the laminated iron core placed on the gate plate according to the first embodiment.

As shown in FIGS. 3 and 4, the gate plate 6 is formed from a flat rectangular plate, and includes an iron core positioning portion 64 provided on the upper surface of the gate plate 6. The laminated iron core 10 can be placed on the upper surface of the gate plate 6 with the iron core positioning portion 64 housed inside the rotary shaft insertion hole 12 in the laminated iron core 10. In addition, device positioning portions 65 are provided on the lower surface of the gate plate 6, and configured to be coupled to predetermined positions on the upper surface of the mold body portion 410 of the resin feeding mold 41.

Figure 5:
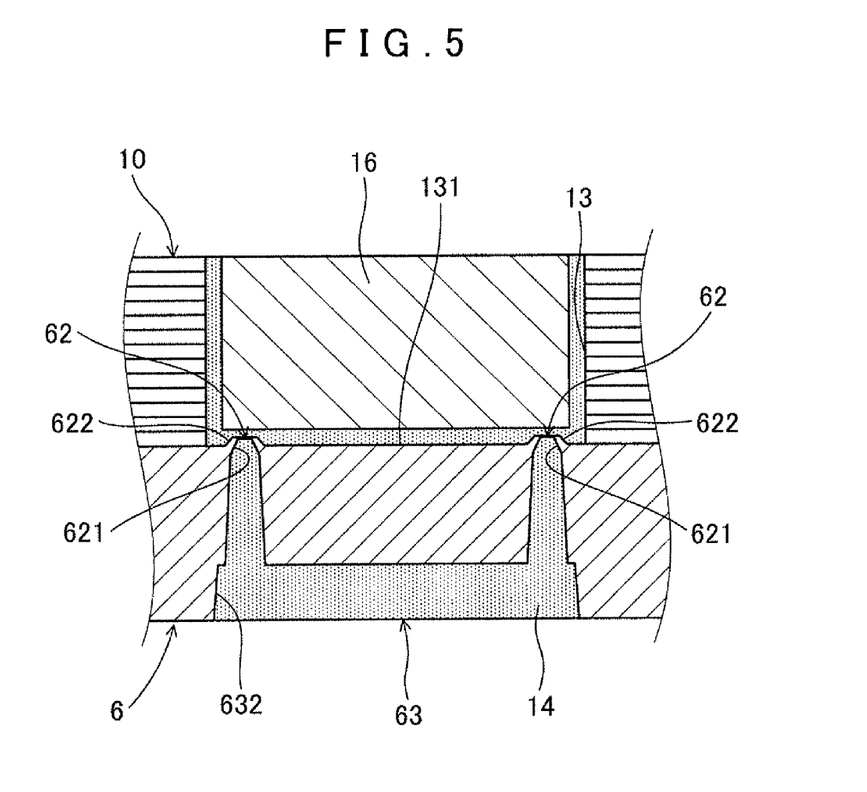
FIG. 5 is a partial enlarged sectional view taken along the line B-B of FIG. 3 with the laminated iron core placed on the gate plate according to the first embodiment.

As shown in FIGS. 3 and 4, the gate plate 6 is provided with the discharge ports 62 disposed so as to face opening portions 131 of the magnet insertion holes 13 of the laminated iron core 10 placed on the upper surface of the gate plate 6. In the present embodiment, as shown in FIG. 3, two discharge ports 62 are provided for the opening portion 131 of each of the magnet insertion holes 13. As shown in FIGS. 4 and 5, the discharge ports 62 are formed to penetrate the gate plate 6 from the lower surface to the upper surface. A diameter reducing portion 621 having an inside diameter becoming gradually smaller along the discharge direction is provided on the inner peripheral surface of each of the discharge ports 62. The interior angle formed between the diameter reducing portion 621 and the axis of the discharge port 62 is preferably in the range of 15° to 60°. In this case, the resin remaining and cured in the discharge port 62 can be divided easily at the diameter reducing portion 621. In the case of an interior angle of less than 15°, the effect of the diameter reducing portion 621 may not be obtained. In the case of an internal angle of more than 60°, meanwhile, the strength of the discharge port 62 may be reduced at the distal-end portion, resulting in damage to the discharge port 62.

As shown in FIG. 5, a projecting portion 622 projected around the discharge port 62 is provided on the upper surface of the gate plate 6. The diameter reducing portion 621 provided on the inner peripheral surface of the discharge port 62 is formed such that the inside diameter of the diameter reducing portion 621 becomes minimum at the inside of the distal end of the projecting portion 622. In addition, the outer peripheral surface of the projecting portion 622 is tapered so as to have a smaller diameter toward its distal end. In the present embodiment, the opening diameter of the distal end of the discharge port 62 is 1 mm, and the projecting height of the projecting portion 622 is 0.5 mm. The interior angle formed between the diameter reducing portion 621 and the axis of the discharge port 62 is 30°, and the interior angle formed between the upper surface of the gate plate 6 and the tapered surface is 45°.

As shown in FIG. 5, a resin flow passage 63 that serves as a flow passage between the feeding mechanism portion 411 and the discharge port 62 is formed in the lower surface of the gate plate 6 at a position corresponding to the feeding mechanism portion 411 of the mold body portion 410 (FIG. 6) when the gate plate 6 is coupled to the mold body portion 410. As shown in FIG. 3, the resin flow passage 63 is formed to include an in-flow portion 631 formed from a generally cylindrical recessed portion, and a branched portion 632 formed from two recessed grooves that separate the molten resin 14 flowing into the in-flow portion 631 into the discharge ports 62 formed in correspondence with the opening portions 131 of two adjacent magnet insertion holes 13.

As shown in FIGS. 3 and 4, the iron core positioning portion 64 provided on the upper surface of the gate plate 6 has a generally cylindrical shape, and is inserted through the rotary shaft insertion hole 12 of the laminated iron core 10 to position the laminated iron core 10 placed on the gate plate 6. Positioning recessed groove portions 641 are formed in the outer peripheral surface of the iron core positioning portion 64 at positions corresponding to the projected portions 121 formed on the inner peripheral surface of the rotary shaft insertion hole 12 of the laminated iron core 10.

As shown in FIGS. 3 and 4, the device positioning portions 65 provided on the lower surface of the gate plate 6 are formed from four flat generally rectangular plates, and provided at positions corresponding to four stepped portions 414 formed along the outline of a surface of the mold body portion 410 in abutment with the gate plate 6.

Coupling between the gate plate 6 and the mold body portion 410 can be carried out in the following manner. That is, the gate plate 6 is moved above the mold body portion 410 while being relatively raised. Then, the gate plate 6 is relatively lowered so that the device positioning portions 65 provided on the lower surface of the gate plate 6 are engaged with the stepped portions 414 provided in the upper surface of the mold body portion 410. In order to decouple the gate plate 6 and the mold body portion 410 from each other, conversely, the gate plate 6 is relatively raised to disengage the device positioning portions 65 and the stepped portions 414 from each other.

Figure 7:
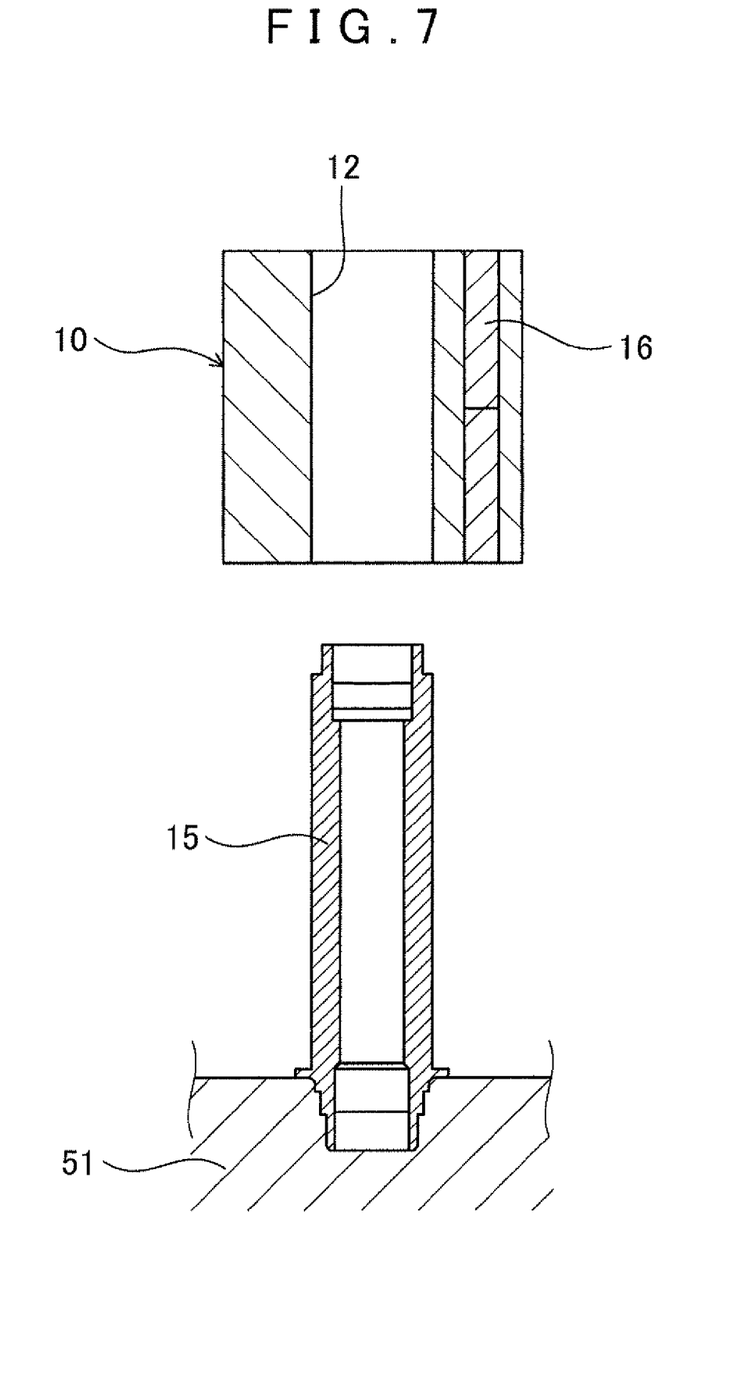
FIG. 7 is a sectional view showing a rotary shaft assembly process according to the first embodiment.

As shown in FIG. 7, the device for execution of the rotary shaft assembly process 5 includes an iron core assembly robot that holds the laminated iron core 10 and automatically assembles the laminated iron core 10 to the rotary shaft 15, and a rotary shaft holding jig 51 that holds the rotary shaft 15 in an upright state.

Next, a manufacturing method for an electric motor rotor according to the embodiment will be described.

In the stacking process 2, a plurality of iron core pieces 11 shaped as shown in FIG. 2 are successively punched out of a belt-like steel sheet, and are stacked on and crimped to each other to form a laminated iron core 10. The laminated iron core 10 is placed on the gate plate 6 at a transfer start point positioned at the terminal end portion of the device for execution of the stacking process 2. At this time, the laminated iron core 10 is placed with the iron core positioning portion 64, which is disposed on the upper surface of the gate plate 6, housed in the rotary shaft insertion hole 12. The magnet insertion holes 13 of the laminated iron core 10 and the discharge ports 62 of the gate plate 6 are aligned with each other by fitting the projected portions 121, which are provided on the inner peripheral surface of the rotary shaft insertion hole 12, and the positioning recessed groove portions 641, which are provided in the outer surface of the iron core positioning portion 64, with each other. Then, the gate plate 6, on which the laminated iron core 10 is placed, is moved on the transfer rail to be transferred to the device for execution of the magnet insertion process 3. The laminated iron core 10 is moved on the transfer rail while being placed on the gate plate 6, until reaching a transfer end point positioned at the terminal end portion of the device for execution of the resin filling process 4.

After the permanent magnets 16 are inserted into the magnet insertion holes 13 by the magnet insertion robot in the magnet insertion process 3 shown in FIG. 1, the laminated iron core 10 is moved to the device for execution of the resin filling process 4.

The laminated iron core 10 and the gate plate 6 pass inside the tunnel-shaped heating device disposed in the device for execution of the resin filling process 4 to be heated to a temperature range of heating temperatures of 150° C. to 200° C., and are transferred into the resin filling device 40. In the resin filling device 40, the gate plate 6 on which the laminated iron core 10 is placed is coupled to the mold body portion 410 as shown in FIG. 6.

After the gate plate 6 on which the laminated iron core 10 is placed is disposed on the mold body portion 410 and the gate plate 6 and the feeding mold are completely coupled to each other, the facing mold 42 is lowered to apply a compression force to the upper surface of the laminated iron core 10. This allows respective abutting surfaces of the facing mold 42, the laminated iron core 10, the gate plate 6, and the resin feeding mold 41, which are sequentially disposed to be stacked, to tightly contact each other.

Then, the plunger 413 of the feeding mechanism portion 411 shown in FIG. 6 is raised to feed the molten resin 14, which is melted in the inner tubular portion 412, toward the in-flow portion 631 of the resin flow passage 63 of the gate plate 6. The molten resin 14 flowing into the resin flow passage 63 is fed to the two discharge ports 62 via the branched portion 632 to be discharged into the magnet insertion holes 13 of the laminated iron core 10. At this time, the plunger 413 continuously rises until the magnet insertion holes 13 are filled with the molten resin 14. Then, after the magnet insertion holes 13 are filled with the molten resin 14, the plunger 413 stops rising, but keeps applying a pressure to the molten resin 14 in a pressure retaining state. While the pressure retaining state is maintained for a predetermined time, the molten resin 14 is heated to be cured. After the resin is cured, the plunger 413 is returned to the initial position to complete operation in the resin filling process 4. Then, the laminated iron core 10 is transferred from the device for execution of the resin filling process 4 to the device for execution of the rotary shaft assembly process 5.

The laminated iron core 10 is separated from the gate plate 6 by the iron core assembly robot at the transfer end point disposed at the starting end portion of the device for execution of the rotary shaft assembly process 5. At this time, the cured resin is divided at the diameter reducing portions 621 provided at the discharge ports 62, which leaves no burrs at the discharge ports 62.

In the rotary shaft assembly process 5, the rotary shaft 15 is disposed upright on the rotary shaft holding jig 51, and the iron core assembly robot attaches the laminated iron core 10 to the rotary shaft 15. At this time, the laminated iron core 10 is naturally cooled to a temperature range of residual heat temperatures of 140° C. to 180° C. while the laminated iron core 10 is moved from the resin filling device 40 disposed in the resin filling process 4 onto the rotary shaft holding jig 51. Also in this temperature range, the inside diameter of the rotary shaft insertion hole 12 of the laminated iron core 10 has been increased, and is larger than the outside diameter of the rotary shaft 15. Then, the laminated iron core 10 is cooled to reduce the inside diameter of the rotary shaft insertion hole 12 so that the laminated iron core 10 and the rotary shaft 15 are fixed to each other through warm fitting.

Next, the effects of the present embodiment will be described.

In the present embodiment, in the rotary shaft assembly process 5, the rotary shaft 15 is warm-fitted into the rotary shaft insertion hole 12 of the laminated iron core 10 utilizing residual heat from the heating of the laminated iron core 10 in the resin filling process 4. Therefore, it is not necessary to dispose a device that heats the laminated iron core 10 for warm fitting in the production line for carrying out the manufacturing method for an electric motor rotor. Then, while it has originally been necessary to provide a dedicated heating process to each of two processes, namely, the resin filling process 4 and the rotary shaft assembly process 5, it is only necessary to provide a heating process as one process in the resin filling process 4. Consequently, it is possible not only to reduce the equipment cost for the heating devices, but also to reduce the time for heating and cooling and the consumption of energy such as electric power during production of electric motor rotors. This further improves the production efficiency for electric motor rotors, and promotes energy saving.

The resin filling process 4 is performed with the laminated iron core 10 heated to the temperature range of heating temperatures discussed above, and the rotary shaft assembly process 5 is performed while the laminated iron core 10 is in the temperature range of residual heat temperatures discussed above because of residual heat from the resin filling process 4. Therefore, resin filling operation in the resin filling process 4 and warm fitting operation in the rotary shaft assembly process 5 can be performed reliably.

Thus, according to the present embodiment, it is possible to provide a manufacturing method for an electric motor rotor that can improve the production efficiency and contribute to energy saving.

In the present embodiment, further, the diameter reducing portion 621 having an inside diameter becoming gradually smaller along the direction of discharging the molten resin 14 is provided on the inner peripheral surface of the discharge port 62 in the resin filling device 40, and the diameter reducing portion 621 becomes minimum in diameter at the distal end of the discharge port 62. Therefore, the resin remaining and cured in the discharge port 62 can be divided easily at the diameter reducing portion 621 to suppress occurrence of burrs on the end surface of the laminated iron core 10.

The projecting portion 622 projected around the discharge port 62 is provided on the upper surface of the gate plate 6, and the diameter reducing portion 621 is provided inside the projected portion 622. Therefore, even if the resin remaining inside the discharge port 62 is left on the laminated iron core 10 side to form some burrs, such burrs are kept inside the end surface of the laminated iron core to cause no adverse effect.

Since occurrence of burrs can be prevented reliably in this manner, it is not necessary to provide a burr removal process to the production line for electric motor rotors. Consequently, the rotary shaft assembly process 5 can be disposed immediately after the resin filling process 4. Hence, the rotary shaft assembly process 5 in which the laminated iron core 10 and the rotary shaft 15 are warm-fitted to each other utilizing residual heat from the resin filling process 4 can be implemented relatively easily.

Comparative Example 1

Here, a comparison was made for the time for heating and cooling and the energy consumption between an embodiment corresponding to the manufacturing method for an electric motor rotor described in the first embodiment and a comparative example in which a dedicated heating device is provided to each of the device for execution of the resin filling process 4 and the device for execution of the rotary shaft assembly process 5.

Figure 8:
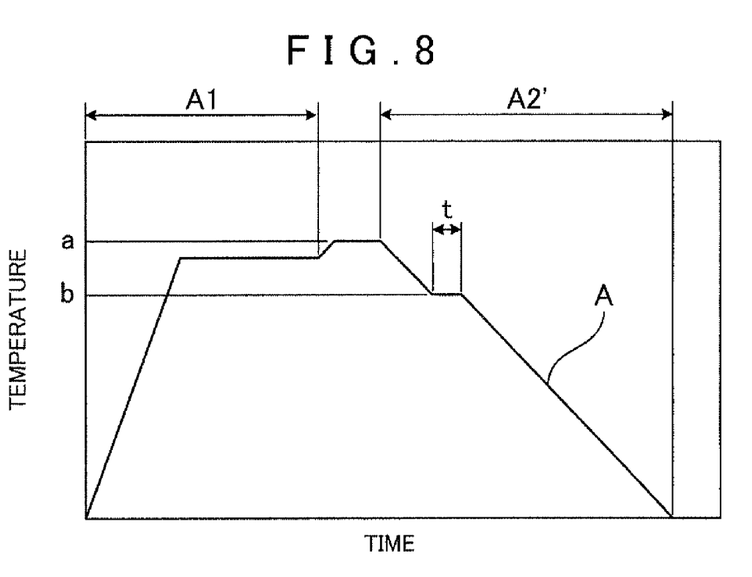
FIG. 8 is a time-temperature graph showing the heating and cooling conditions for a resin filling process and the rotary shaft assembly process of an embodiment, referenced in Comparative Example 1.
Figure 9:
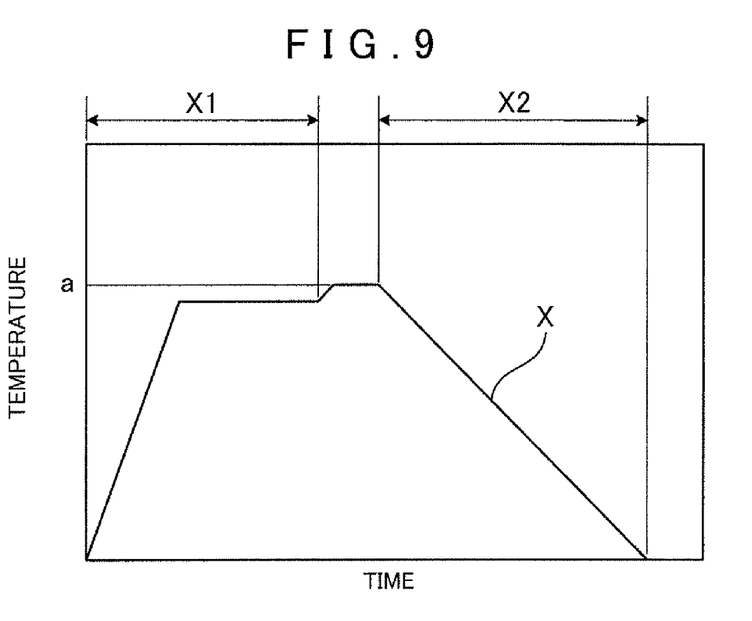
FIG. 9 is a time-temperature graph showing the heating and cooling conditions for a resin filling process of a comparative example, referenced in Comparative Example 1.
Figure 10:
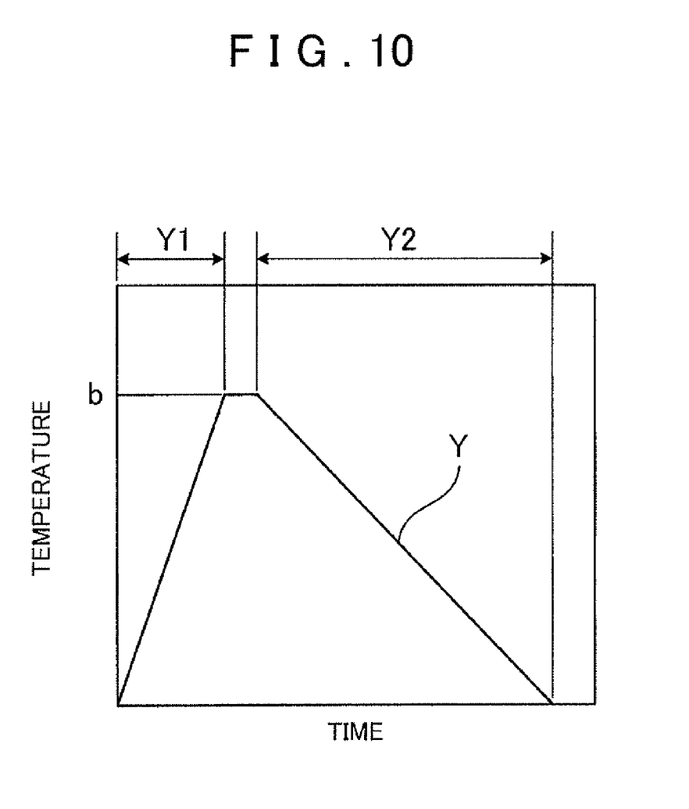
FIG. 10 is a time-temperature graph showing the heating and cooling conditions for a rotary shaft assembly process of the comparative example, referenced in Comparative Example 1.

FIG. 8 shows changes in temperature of the laminated iron core 10 and time in the resin filling process 4 and the rotary shaft assembly process 5 according to the embodiment by a solid line A. In the graph of FIG. 8, the vertical axis indicates the temperature of the laminated iron core 10, and the horizontal axis indicates the time. FIG. 9 shows changes in temperature of the laminated iron core 10 and time in the resin filling process 4 according to the comparative example by a solid line X. FIG. 10 shows changes in temperature of the laminated iron core 10 and time in the rotary shaft assembly process 5 according to the comparative example by a solid line Y.

In the embodiment, as shown in FIG. 8, heating and cooling is performed once for two processes, namely the resin filling process 4 and the rotary shaft assembly process 5. This requires a heating time A1 and a cooling time A2. In the embodiment, in addition, energy for heating up to a resin filling temperature a is consumed. The cooling time A2 is obtained by subtracting from A2' indicated in the drawing an operation time t for warm fitting in the rotary shaft assembly process 5.

In the comparative example, on the other hand, heating and cooling is performed in each of the resin filling process 4 and the rotary shaft assembly process 5. This requires a heating time X1 and a cooling time X2 in the resin filling process 4 as shown in FIG. 9, and further requires a heating time Y1 and a cooling time Y2 in the rotary shaft assembly process 5 as shown in FIG. 10. In the comparative example, in addition, energy for heating up to the resin filling temperature a is consumed as in the embodiment, and energy for heating up to a warm fitting temperature b is further consumed. The heating time A1 in the embodiment and the heating time X1 in the resin filling process 4 in the comparative example are generally equal to each other. The cooling time A2 in the embodiment and the cooling time X2 in the resin filling process 4 in the comparative example are generally equal to each other.

Thus, in the embodiment, the heating time Y1 and the cooling time Y2 in the rotary shaft assembly process 5 in the comparative example are not required, and energy consumption required for heating up to the warm fitting temperature b can be saved.

The invention claimed is:

1. A manufacturing method for an electric motor rotor, comprising:
    a stacking process of stacking a plurality of iron core pieces formed in a desired shape to form a laminated iron core;
    a magnet insertion process of inserting a magnet into a magnet insertion hole provided in the laminated iron core;
    a resin filling process of heating the laminated iron core to fill the magnet insertion hole with a molten resin for magnet fixation; and
    a rotary shaft assembly process of warm-fitting a rotary shaft into a rotary shaft insertion hole of the laminated iron core utilizing residual heat from the heating of the laminated iron core in the resin filling process.

2. The manufacturing method for an electric motor rotor according to claim 1, wherein
    the resin filling process is performed with the laminated iron core heated to a temperature range of 150° C. to 200° C., and the rotary shaft assembly process is performed while the laminated iron core is in a temperature range of 140° C. to 180° C. because of residual heat from the resin filling process.

* * * * *